3,278,270
PREGNANCY TEST
Eric T. Fossel, New Haven, Conn., assignor to Unimed Inc., Morristown, N.J., a corporation of Delaware
No Drawing. Filed Mar. 13, 1964, Ser. No. 351,837
9 Claims. (Cl. 23—230)

This application relates to pregnancy tests, and more particularly to methods of determining whether or not female animals, and particularly women, are pregnant.

Numerous tests for determining the pregnancy of female animals, and particularly women, and, for the purposes of this application and simplicity of discussion, reference will always be made to women, though it is to be understood that the application refers to pregnancy tests which can be used for other female animals, are well known. The most famous pregnancy test is the test carried out on using AZ-rabbits to indicate whether the woman is pregnant. In this test the animal is injected with the urine of the woman who is suspected of being pregnant, and several days later the animal is killed and the ovaries thereof examined to determine whether hemorrhagic spots have developed, which would indicate pregnancy of the woman. Actually, the well known AZ test is carried out on mice, and it is the modification thereof by the Friedman test which uses rabbits.

One of the disadvantages of all of the known pregnancy tests is that the same are relatively expensive because they require the killing of animals which have to be raised especially for the tests, and in addition to the expense thereof, the tests are relatively expensive because of the time involved and the need for skilled technicians to carry out the tests. Furthermore, the known tests suffer from the disadvantage of requiring relatively long periods of time—one day to several days—before an answer can be given.

It is accordingly a primary object of the present invention to provide a purely chemical pregnancy test; that is, a test which does not rely at all on animals and which is simply accomplished by the mixing of chemicals with the urine of the woman who is suspected of being pregnant.

It is another object of the present invention to provide a simple chemical pregnancy test which can be carried out even by the unskilled layman and which gives results with accuracies at least equal to and generally better than those obtainable with known pregnancy tests.

It is yet another object of the present invention to provide a purely chemical pregnancy test which within a very short time, as little as a minute, can give an answer to the question of whether or not the woman is pregnant.

Other objects and advantages of the present invention will be apparent from a further reading of the specification and of the appended claims.

With the above and other objects in view, the present invention mainly comprises a chemical pregnancy test which comprises mixing the urine of a woman or other female animal who is suspected of being pregnant with a compound which will form a chelate with the magnesium of chorionic gonadotropin to form an insoluble compound. The formation of a precipitate will, therefore, be an indication that the woman is pregnant, while a clear solution will indicate that the woman is not pregnant.

The test is preferably carried out by overlaying a compound, which may be in solution form, which will form an insoluble chelate with the polyvalent cations such as iron, calcium and particularly magnesium of the chorionic gonadotropin onto the urine. For purposes of simplicity reference will hereinafter be made to the chelation with the magnesium though it is to be understood that chelation may also take place to a greater or lesser extent with iron and/or calcium. The formation of a precipitate at the interface is an indication of pregnancy.

Although the present invention is not meant to be limited as to any theory as to how or why the same will give an indication as to whether or not the woman is pregnant, the following theory is given in the hope that it will help other investigators in this field. It is believed that during pregnancy the woman will excrete chorionic gonadotropin in her urine, and that chorionic gonadotropin includes chelated metal ions, particularly magnesium ions. The admixture, therefore, of the female urine with a compound which is soluble in the urine but which will with the magnesium ions of the chorionic gonadotropin form an insoluble precipitate will indicate by the presence of such precipitate that the woman whose urine is being tested is pregnant, and by the absence of such precipitate that the woman whose urine is being tested is not pregnant.

It is preferred to carry out the test by mixing of the urine of the suspected pregnant woman with one or more compounds selected from the group consisting of compounds of the formulas:

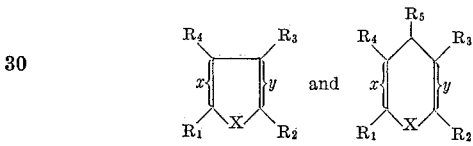

wherein $x$ and $y$ are each selected from the group consisting of single bonds and double bonds, wherein X is selected from the group consisting of oxygen and sulphur, and wherein $R_1$, $R_2$, $R_3$, $R_4$ and $R_5$ are each selected from the group consisting of hydrogen, CHO, lower alkyl, lower alkylhydroxy and OR wherein R is selected from the group consisting of lower alkyl and lower alkylhydroxy. It has been found that compounds of the above general formulas will, in the case of urine from a pregnant woman, form an insoluble precipitate which is an indication of a positive reaction, i.e. that the woman is pregnant, while with the urine of a woman who is not pregnant no precipitate will be formed, which is an indication of a negative reaction, i.e. that the woman is not pregnant.

Hundreds of tests have been carried out on urine samples and it has been found that the compounds of the present invention when used in the pregnancy test described herein will give a greater degree of accuracy than can be obtained with the known pregnancy tests carried out with rabbits, frogs, etc. As in the case of other pregnancy tests, the pregnancy test of the present invention is most accurate during the second and third months of pregnancy.

The most preferred compounds, that is the most readily available compounds giving the most accurate and most easily observable results, are:

Acrolein dimer (pyran aldehyde)

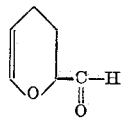

Three-(or four-)ethoxy dihydro pyran

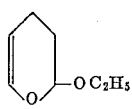

Dihydro pyran

Dihydro furan

Thiophene

and 3,4-dihydro 2H-pyran-2-methanol

In carrying out test in accordance with the present invention, it is actually possible to use any proportion of urine to the testing compound. As is clear from the above, the testing compound should be contacted with the urine in liquid condition. Thus, if the testing compound is a liquid, then the same may be directly contacted with the urine, most preferably by an interface reaction, that is by overlaying the urine onto the testing compound, or, more preferably, by overlaying the testing compound onto the urine. If the testing compound is not in liquid form, then it may be added to the urine in the form of a solution of the testing compound.

By carrying out the test by means of an interface reaction between the two layers, that is the layer of urine and the layer of testing compound, an accurate result can be achieved with any proportion of urine to testing compound. However, in carrying out this test the most convenient method which has been used is to introduce about 1 cc. of urine into a 0.8 mm. test tube and to overlay thereon 0.2 cc. of the testing material. Even in this practical carrying out of the method of the present invention, it is clear that the proportions can vary widely. For example, it is possible to use 1–2 cc. of urine and from 0.2–2.0 cc. of the test material. The proportions are not at all critical, particularly when the reaction is carried out as an interface reaction between two layers.

In accordance with preferred embodiment of the present invention, 0.5–2 cc. of urine are mixed with from 0.2–2 cc. of the test material and shaken, and then from 0.2–1.5 cc. of water are gently added on top of the solution. The appearance of cloudiness, which is a visible indication of the formation of an insoluble precipitate, is an indication of a positive test, that is pregnancy is present, while the remaining of a clear solution is an indication of a negative test, that is non-pregnancy.

The following examples are given to further illustrate the present invention. The scope of the invention is not, however, meant to be limited to the specific details of the examples.

Example 1

1 cc. of urine is placed in a 0.8 mm. (I.D.) test tube. 0.2 cc. of 2-ethoxy dihydro pyran are placed on top of the urine. After 20 minutes a white ring develops if the test is positive for pregnancy, while, if the patent who donated the urine is not pregnant, no ring is found.

By shaking the urine and the testing material together the reaction is faster, and instead of a ring between the two layers being formed, after shaking, when the two layers again separate, the 2-ethoxy-dihydro pyran layer will be cloudy for a positive test and clear for a negative test.

Example 2

This test is carried out exactly as described for Example 1, however, using dihydro pyran as the test material.

Example 3

This test is carried out exactly as described in Example 1; however, using dihydro pyran 2-methanol as the testing compound.

Example 4

This test is carried out exactly as described in Example 1; however, using dihydro furan as the testing material.

Example 5

This test is carried out exactly as described in Example 1; however, using thiophene as the testing material.

Example 6

1 cc. of urine is placed in a 0.8 mm. (I.D.) test tube. To this is added 0.6 cc. of acrolein dimer. The tube is shaken vigorously for 30–40 seconds. Upon this shaking, an intense heat is evolved if the test is positive, and only mild to no heat is evolved if the test is negative.

For further confirmation, 0.5 cc. of water is overlaid onto the shaken solution and allowed to stand for 30 seconds to one minute, after which time a ring may be observed between the water and the shaken mixtures if the test is positive. By allowing the same to stand for a longer period of time, the ring becomes more intense. If the test is negative, no ring will be observed.

If the water is not overlaid gently, the entire water layer will first become cloudy and then opaque in the event of a positive test, but will remain non-cloudy in the event of a negative test.

In the case of the test with acrolein dimer, which is the most preferred compound for the purposes of the present invention, the test may be read within one–two minutes after the addition of the water.

In the case of the other tests described above, the time required to determine whether or not the patient is pregnant is from 2–40 minutes, depending on the degree of pregnancy and the pH of the urine.

Although the above tests can be carried out by any unskilled person, in carrying out the test in laboratories it is preferred to adjust the pH of the urine being tested to a value of 6.5, which is the optimum value for the tests according to the present invention. After the adjustment of the pH, the tests can be carried out as described above to very accurately determine whether or not the patient is pregnant.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent, is:

1. Method of determining whether or not a woman is pregnant, which comprises contacting the woman's urine with a compound selected from the group consisting of compounds of the formula:

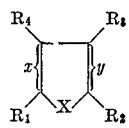

and, compounds of the formula:

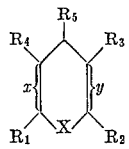

wherein $x$ and $y$ are each selected from the group consisting of single bonds and double bonds, wherein X is selected from the group consisting of oxygen and sulphur, and wherein $R_1$, $R_2$, $R_3$, $R_4$ and $R_5$ are each selected from the group consisting of hydrogen, CHO, lower alkyl, lower alkylhydroxy and OR wherein R is selected from the group consisting of lower alkyl and lower alkylhydroxy, whereby the formation of a precipitate indicates that the woman is pregnant, and no precipitate formation indicates that the woman is not pregnant, the amount of urine and of said compound being sufficient so that any precipitate formation is visible.

2. Method of determining whether or not a woman is pregnant, which comprises contacting the woman's urine with acrolein dimer in a ratio of about 0.5–2 cc. of urine to about 0.2–2 cc. of acrolein dimer, whereby the formation of a precipitate is an indication that the woman is pregnant, and no precipitate formation is an indication that the woman is not pregnant.

3. Method of determining whether or not a woman is pregnant, which comprises contacting the woman's urine with ethoxy-3,4-dihydro pyran in a ratio of about 0.5–2 cc. of urine to about 0.2–2 cc. of ethoxy-3,4-dihydro pyran, whereby the formation of a precipitate is an indication that the woman is pregnant, and no precipitate formation is an indication that the woman is not pregnant.

4. Method of determining whether or not a woman is pregnant, which comprises contacting the woman's urine with dihydro pyran in a ratio of about 0.5–2 cc. of urine to about 0.2–2 cc. of dihydro pyran, whereby the formation of a precipitate is an indication that the woman is pregnant, and no precipitate formation is an indication that the woman is not pregnant.

5. Method of determining whether or not a woman is pregnant, which comprises contacting the woman's urine with dihydro furan in a ratio of about 0.5–2 cc. of urine to about 0.2–2 cc. of dihydro furan, whereby the formation of a precipitate is an indication that the woman is pregnant, and no precipitate formation is an indication that the woman is not pregnant.

6. Method of determining whether or not a woman is pregnant, which comprises contacting the woman's urine with thiophene in a ratio of about 0.5–2 cc. of urine to about 0.2–2 cc. of thiophene, whereby the formation of a precipitate is an indication that the woman is pregnant, and no precipitate formation is an indication that the woman is not pregnant.

7. Method of determining whether or not a woman is pregnant, which comprises contacting the woman's urine with 3,4-dihydro 2H-pyran-2-methanol in a ratio of about 0.5–2 cc. of urine to about 0.2–2 cc. of 3,4-dihydro 2H-pyran-2-methanol, whereby the formation of a precipitate is an indication that the woman is pregnant, and no precipitate formation is an indication that the woman is not pregnant.

8. Method of determining whether or not a woman is pregnant, which comprises forming onto a layer of the woman's urine an overlayer of a compound selected from the group consisting of compounds of the formula:

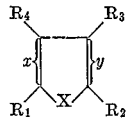

and, compounds of the formula:

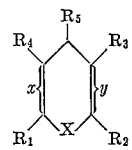

wherein $x$ and $y$ are each selected from the group consisting of single bonds and double bonds, wherein X is selected from the group consisting of oxygen and sulphur, and wherein $R_1$, $R_2$, $R_3$, $R_4$ and $R_5$ are each selected from the group consisting of hydrogen, CHO, lower alkyl, lower alkylhydroxy and OR wherein R is selected from the group consisting of lower alkyl and lower alkylhydroxy in a ratio of about 0.5–2 cc. of urine to about 0.2–2 cc. of said compound, whereby the formation of a precipitate indicates that the woman is pregnant, and no precipitate formation indicates that the woman is not pregnant.

9. Method of determining whether or not a woman is pregnant, which comprises agitating a sample of the woman's urine with a compound selected from the group consisting of compounds of the formula:

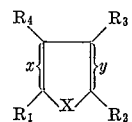

and, compounds of the formula:

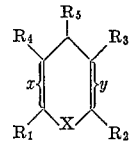

wherein $x$ and $y$ are each selected from the group consisting of single bonds and double bonds, wherein X is selected from the group consisting of oxygen and sulphur, and wherein $R_1$, $R_2$, $R_3$, $R_4$ and $R_5$ are each selected from the group consisting of hydrogen, CHO, lower alkyl, lower alkylhydroxy and OR wherein R is selected from the group consisting of lower alkyl and lower alkylhydroxy in a ratio of about 0.5–2 cc. of urine to about 0.2–2 cc. of said compound, and contacting the thus formed mixture with water in a ratio of about 0.2–1.5 cc. of water to about 0.2–2 cc. of said compound, whereby the formation of a precipitate is an indication that the woman is pregnant, and no precipitate formation is an indication that the woman is not pregnant.

References Cited by the Examiner
UNITED STATES PATENTS

| | | | |
|---|---|---|---|
| 2,564,247 | 8/1951 | Carson et al. | 23—230 |
| 2,587,221 | 2/1952 | Richardson et al. | 23—230 |
| 3,226,196 | 12/1965 | LaVietes | 23—230 |

OTHER REFERENCES

Hawk: Practical Physiological Chemistry, 1954, page 788.

Roth: U.S. Armed Forces Medical Journal, vol. V, No. 1, January 1954, pages 83–85.

MORRIS O. WOLK, *Primary Examiner.*

ZOLTAN PAROCZAY, *Assistant Examiner.*